US010336303B2

(12) United States Patent
No

(10) Patent No.: US 10,336,303 B2
(45) Date of Patent: Jul. 2, 2019

(54) ELECTRONIC PARKING BRAKE SYSTEM

(71) Applicant: MANDO CORPORATION, Pyeongtaek-si, Gyeonggi-do (KR)

(72) Inventor: Su-Hwan No, Suwon-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 58 days.

(21) Appl. No.: 15/800,981

(22) Filed: Nov. 1, 2017

(65) Prior Publication Data
US 2018/0118177 A1 May 3, 2018

(30) Foreign Application Priority Data

Nov. 2, 2016 (KR) .................. 10-2016-0145002

(51) Int. Cl.
*B60T 8/17* (2006.01)
*B60T 13/74* (2006.01)
*H02P 7/28* (2016.01)
*H02P 7/03* (2016.01)
*H02P 31/00* (2006.01)

(52) U.S. Cl.
CPC .............. *B60T 8/17* (2013.01); *B60T 13/741* (2013.01); *H02P 7/03* (2016.02); *H02P 7/28* (2013.01); *H02P 31/00* (2013.01)

(58) Field of Classification Search
CPC .......... B60T 8/17; B60T 13/741; B60T 8/171; B60T 13/746; B60T 13/667
See application file for complete search history.

(56) References Cited

U.S. PATENT DOCUMENTS

| 2015/0100215 A1* | 4/2015 | Sussek | B60T 13/662 701/70 |
| 2015/0142288 A1* | 5/2015 | Sato | B60T 13/741 701/70 |
| 2018/0148022 A1* | 5/2018 | Misumi | B60T 8/171 |

FOREIGN PATENT DOCUMENTS

| JP | 2015-519243 A | 7/2015 |
| KR | 10-2014-0143378 A | 12/2014 |

* cited by examiner

*Primary Examiner* — Melanie Torres Williams
(74) *Attorney, Agent, or Firm* — Morgan Lewis & Bockius LLP

(57) ABSTRACT

Disclosed is an electronic parking brake (EPB) system. The EPB system has an EPB actuator operated by an electric motor, and the EPB system includes a motor driver configured to drive the electric motor of the EPB actuator; a current sensor configured to sense a current flowing in the electric motor; a voltage sensor configured to sense a voltage supplied to the electric motor; and an electronic control unit (ECU) configured to change a target current to correspond to a parking apply mode that is executed on the basis of a voltage supplied to the electric motor, which is sensed through the voltage sensor when the parking apply mode is executed, and control an operation of the electric motor according to the changed target current.

7 Claims, 7 Drawing Sheets

ELECTRONIC PARKING BRAKE SYSTEM

This application claims the benefit of Korean Patent Application No. 2016-0145002, filed on Nov. 2, 2016 in the Korean Intellectual Property Office, the disclosure of which is incorporated herein by reference.

BACKGROUND

1. Field

Embodiments of the present disclosure relate to an electronic parking brake (EPB) system, and more particularly, to an EPB system configured to control operation and release of an EPB.

2. Description of the Related Art

Generally, an electronic parking brake (EPB) system is used to electronically control driving of a parking brake and is mounted on a conventional disc brake to perform a parking brake function.

The EPB system is configured with an EPB actuator having an electric motor configured to generate a braking force and an electronic control unit (ECU) configured to drive the EPB actuator. The ECU drives the EPB actuator to apply or release the parking brake.

Recently, as safety requirements of electronic components are intensified, various functional safety requirements of an EPB system have a great impact on product competitiveness.

The EPB system is classified into a cable puller type EPB system and a motor-on-caliper type EPB system according to an operating method thereof.

The motor-on-caliper type EPB system increases torque generated from an electric motor through a decelerator to generate a required parking braking force by a mechanical structure inside a caliper. At this point, a current signal is only a control factor provided to control the required parking braking force. When a current reaches a predetermined value, the motor-on-caliper type EPB system determines that the required parking braking force is satisfied using the principle that output torque of the electric motor is proportional to the current, thereby terminating the control of the electric motor.

Actually, owing to various factors such as a voltage fluctuation of the electric motor and the like, however, the parking braking force varies and the control of the parking braking force is occasionally terminated when the parking brake force is not insufficiently formed.

In order to compensate for a variation of the parking braking force, a margin for the parking brake force is typically set to be much larger such that there is a problem of causing a loss of competitiveness in a price and weight of a product.

SUMMARY

Therefore, it is one aspect of the present disclosure to provide an electronic parking brake (EPB) system capable of constantly maintaining a parking braking force using a voltage applied to an electric motor which significantly affects a parking brake force.

Additional aspects of the disclosure will be set forth in part in the description which follows and, in part, will be obvious from the description, or may be learned by practice of the disclosure.

In accordance with one aspect of the present disclosure, an EPB system having an EPB actuator operated by an electric motor, the EPB system includes a motor driver configured to drive the electric motor of the EPB actuator; a current sensor configured to sense a current flowing in the electric motor; a voltage sensor configured to sense a voltage supplied to the electric motor; and an electronic control unit (ECU) configured to change a target current to correspond to a parking apply mode that is executed on the basis of a voltage supplied to the electric motor, which is sensed through the voltage sensor when the parking apply mode is executed, and control an operation of the electric motor according to the changed target current.

When the sensed voltage is higher than a target voltage, the ECU may change the target current to a first target current having a current value that is lower than a reference current value.

When the sensed voltage is lower than a target voltage, the ECU may change the target current to a second target current having a current value that is higher than a reference current value.

The ECU may change the target current to correspond to the parking apply mode that is executed on the basis of a voltage supplied to the electric motor, which is sensed through the voltage sensor in an idle section in which no load acts on the electric motor to form an idle state.

In accordance with another aspect of the present disclosure, an EPB system having an EPB actuator operated by an electric motor, the EPB system includes a motor driver configured to drive the electric motor of the EPB actuator; a current sensor configured to sense a current flowing in the electric motor; a voltage sensor configured to sense a voltage supplied to the electric motor; and an electronic control unit (ECU) configured to drive the electric motor by supplying power to the electric motor through the motor driver when a parking apply mode is executed, sense a voltage supplied to the electric motor through the voltage sensor in an idle section in which no load acts on the electric motor to form an idle state while the electric motor is driven, change a target current to correspond to the parking apply mode that is executed on the basis of the sensed voltage, sense the current flowing in the electric motor through the current sensor, and drive the electric motor until the sensed current reaches the changed target current.

In accordance with still another aspect of the present disclosure, an EPB system having an EPB actuator operated by an electric motor, the EPB system includes a motor driver configured to drive the electric motor of the EPB actuator; a current sensor configured to sense a current flowing in the electric motor; a voltage sensor configured to sense a voltage of a vehicle battery supplying power to the electric motor; and an electronic control unit (ECU) configured to sense the voltage of the vehicle battery through the voltage sensor, change a target current to correspond to a parking apply mode that is executed on the basis of the sensed voltage of the vehicle battery when the parking apply mode is executed, and control an operation of the electric motor according to the changed target current.

When the sensed voltage of the vehicle battery is higher than the target voltage, the ECU may change the target current to a first target current having a current value that is lower than a reference current value, and, when the sensed voltage of the vehicle battery is lower than the target voltage, the ECU may change the target current to a second target current having a current value that is higher than the reference current value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
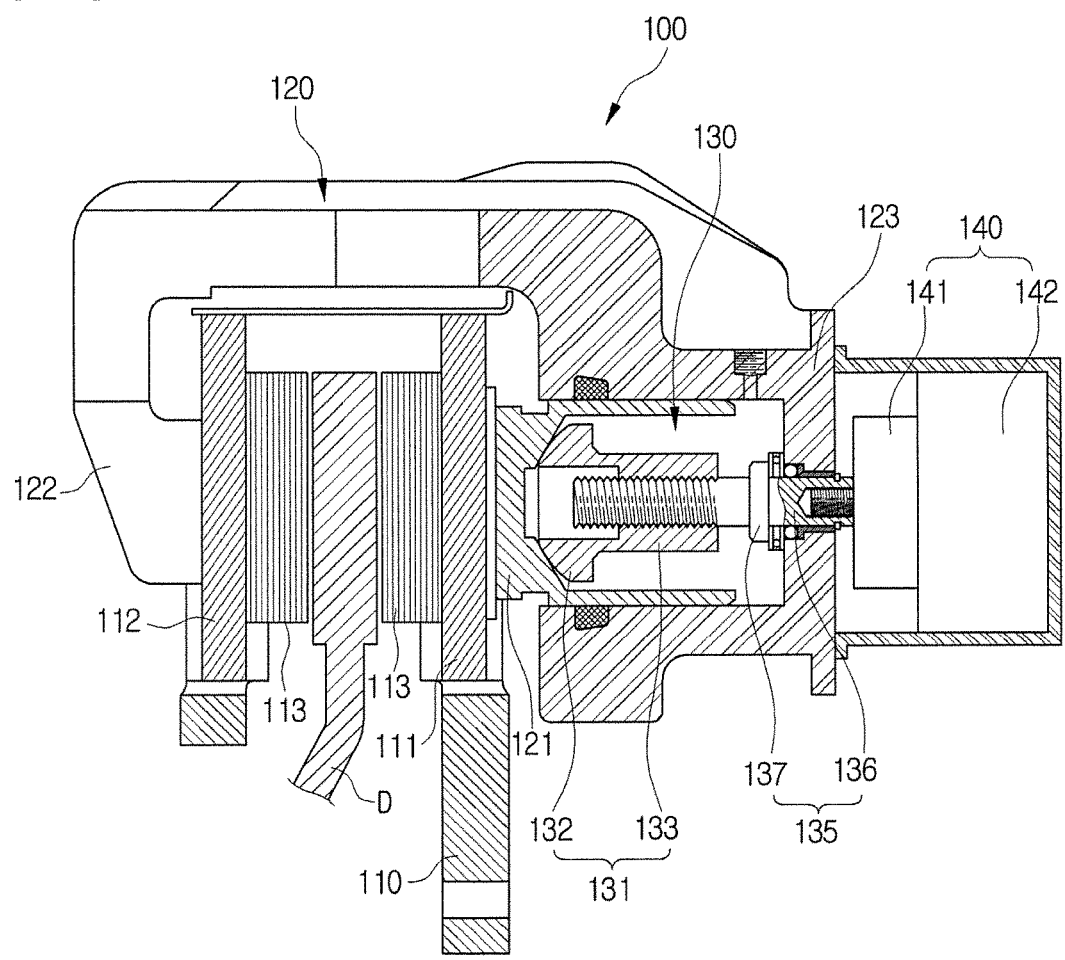
FIG. 1 is a cross-sectional view schematically illustrating an electronic parking brake (EPB) applied to an EPB system according to one embodiment of the present disclosure.

Hereinafter, embodiments of the present disclosure will be described in detail with reference to the accompanying drawings. The embodiments to be described below are provided as examples to fully convey the spirit of the present disclosure to those skilled in the art. The present disclosure is not limited to the embodiments disclosed herein and may be implemented in other forms. In order to clearly describe the present disclosure, parts not related to the description will be omitted from the drawings, and widths, lengths, thicknesses, and the like of components in the drawings may be exaggerated for convenience. Throughout the disclosure, the same reference numerals indicate the same components.

FIG. 1 is a cross-sectional view schematically illustrating an electronic parking brake (EPB) applied to an EPB system according to one embodiment of the present disclosure.

Referring to FIG. 1, an EPB 100 may include a carrier 110 at which a pair of pad plates 111 and 112 are installed to be movable forward and backward to squeeze a disc D rotating with a wheel of a vehicle, a caliper housing 120 slidably installed at the carrier 110 and provided with a cylinder 123 in which a piston 121 is installed to be movable forward and backward by a braking hydraulic pressure, a power converter 130 configured to pressurize the piston 121, and an EPB actuator 140 configured to deliver a rotational force to the power converter 130.

The pair of pad plates 111 and 112 are classified into an inner pad plate 111 disposed to be in contact with the piston 121 and an outer pad plate 112 disposed to be in contact with a finger 122 of the caliper housing 120. The pair of pad plates 111 and 112 are installed at the carrier 110 fixed to a vehicle body to be movable forward and backward toward both sides of the disc D. A friction pad 113 is attached to one surface of each of the pad plates 111 and 112 which faces the disc D.

The caliper housing 120 is slidably installed at the carrier 110. More particularly, the power converter 130 is installed at a rear portion of the caliper housing 120, and the caliper housing 120 includes the cylinder 123 having the piston 121 provided therein to be moved forward and backward, and the finger 122 formed at a front portion of the caliper housing 120 and downwardly bent to operate the outer pad plate 112. The finger 122 and the cylinder 123 are integrally formed.

The piston 121 is provided in a cylindrical form having a concave cup-shaped interior and is slidably inserted into the cylinder 123. The piston 121 pressurizes the inner pad plate 111 toward the disc D by an axial force of the power converter 130 receiving a braking hydraulic pressure or the rotational force of the EPB actuator 140. Accordingly, when a hydraulic pressure for braking is applied to an inside of the cylinder 123, the piston 121 is moved forward to pressurize the inner pad plate 111 and the caliper housing 120 is moved in an opposite direction against the piston 121 by a reaction force, and thus the finger 122 pressurizes the outer pad plate 112 toward the disc D such that braking may be performed.

The power converter 130 serves to receive the rotational force from the EPB actuator 140, which is configured with an electric motor 141 and a decelerator 142, to pressurize the piston 121 toward the inner pad plate 111. The power converter 130 is installed and disposed inside the piston 121, and includes a nut member 131 in contact with the piston 121, and a spindle member 135 screw-coupled to the nut member 131.

The nut member 131 is disposed inside the piston 121 in a rotationally restricted state and is screw-coupled to the spindle member 135. The nut member 131 is configured with a head 132 provided to be in contact with the piston 121, and a coupler 133 formed to extend from the head 132 and having a female screw thread formed on an inner circumferential surface of the coupler 133 to be screw-coupled to the spindle member 135.

Thus, the nut member 131 is moved forward and backward according to a rotational direction of the spindle member 135, thereby serving to pressurize and release the piston 121.

The spindle member 135 includes a shaft 136 passing through the rear portion of the caliper housing 120 and rotated by receiving a rotational force of the electric motor 141, and a flange 137 formed to radially extend from the shaft 136. One side of the shaft 136 passes through a rear side of the cylinder 123 to be rotatably installed at the cylinder 123, and the other side thereof is disposed inside the piston 121. At this point, the one side of the shaft 136 passing through the cylinder 123 is connected to an output shaft of the decelerator 142 to receive the rotational force of the electric motor 141.

With the above-described configuration, the EPB 100 receives power through the EPB actuator 140 in a parking apply mode to rotate the spindle member 135 so that the nut member 131 pressurizes the piston 121. Accordingly, the piston 121 pressurizes the inner pad plate 111, and thus the friction pad 113 is brought into close contact with the disc D such that a parking braking force is generated.

Figure 2:
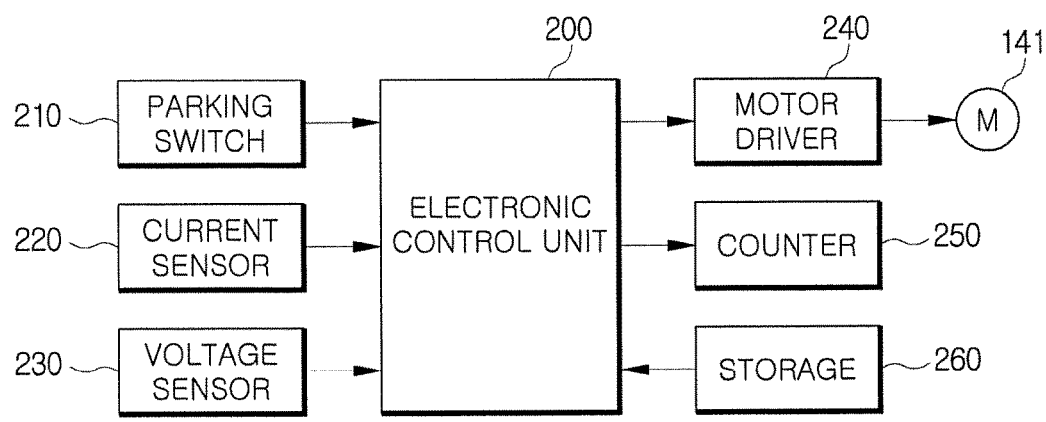
FIG. 2 is a control block diagram of the EPB system according to one embodiment of the present disclosure.

FIG. 2 is a control block diagram of the EPB system according to one embodiment of the present disclosure.

Referring to FIG. 2, the EPB system includes an electronic control unit (ECU) 200 configured to perform overall control related to an operation of the EPB 100.

The ECU 200 is electrically connected to a parking switch 210, a current sensor 220, a voltage sensor 230, a motor driver 240, a counter 250, and a storage 260.

When a driver turns on the parking switch 210, the parking switch 210 transmits a parking operation signal for applying the EPB system to the ECU 200, and, when the driver turns off the parking switch 210, the parking switch 210 transmits a parking release signal for releasing the EPB system to the ECU 200. That is, the EPB system is switched to an applied state or a released state according to a manipulation state of the parking switch 210.

The current sensor 220 senses a current flowing in the electric motor 141 and transmits information on the sensed current to the ECU 200. For example, the current sensor 220 may sense a motor current flowing in the electric motor 141 using a shunt resistor or a Hall sensor. In addition to the shunt resistor or the Hall sensor, the current sensor 220 may employ various devices capable of sensing the motor current.

The voltage sensor 230 senses a voltage applied to the electric motor 141 and transmits information on the sensed voltage to the ECU 200. The voltage sensor 230 may include a voltage sensor configured to sense the voltage of the electric motor 141.

The motor driver 240 supplies electric power to the electric motor 141 to rotate the electric motor 141 in forward or backward directions. For example, the motor driver 240 may include an H-Bridge circuit configured with a plurality of power switching elements to rotate the electric motor 141 in the forward and backward directions.

Figure 3:
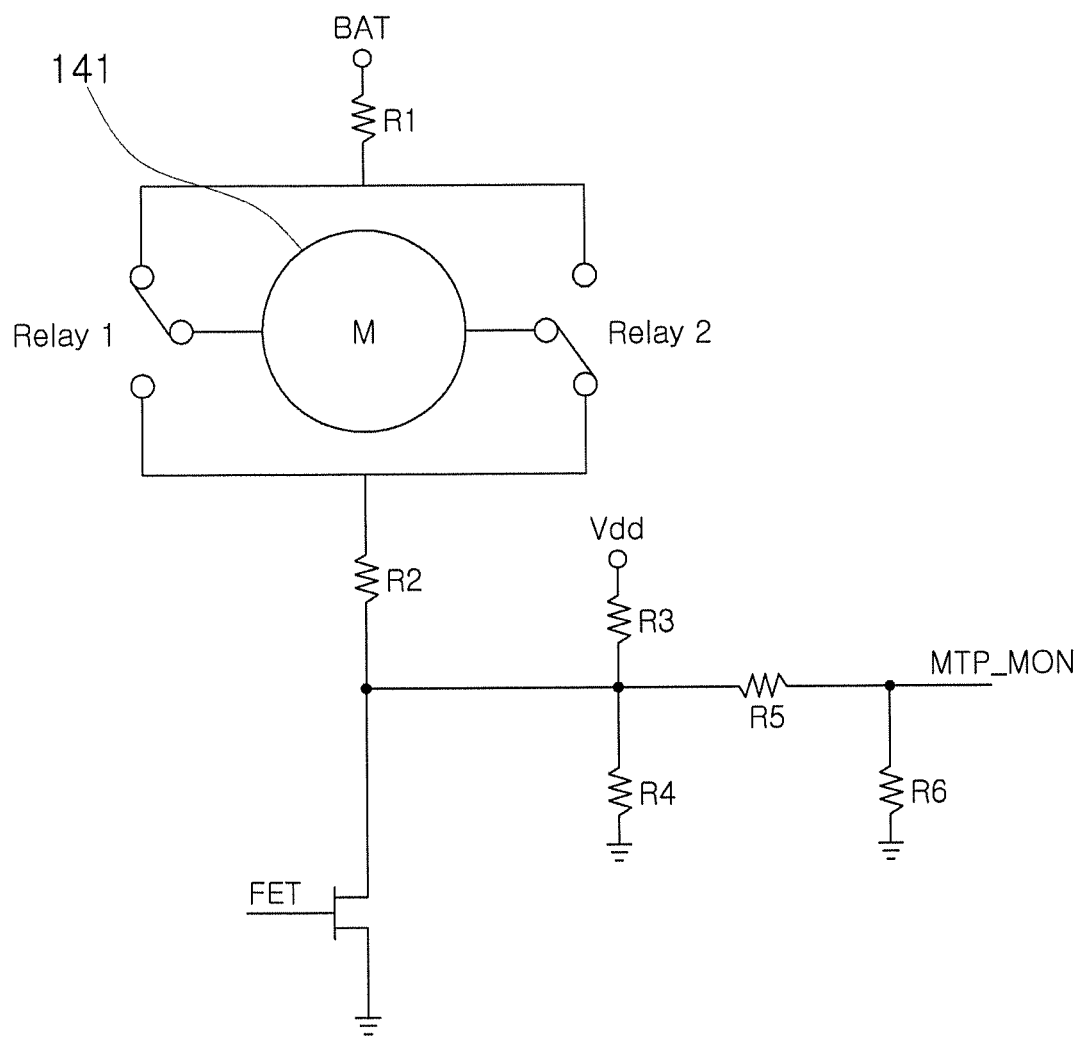
FIG. 3 is a diagram for describing an operation of an electric motor in a parking apply mode and a parking release mode in the EPB system according to one embodiment of the present disclosure.
Figure 4:
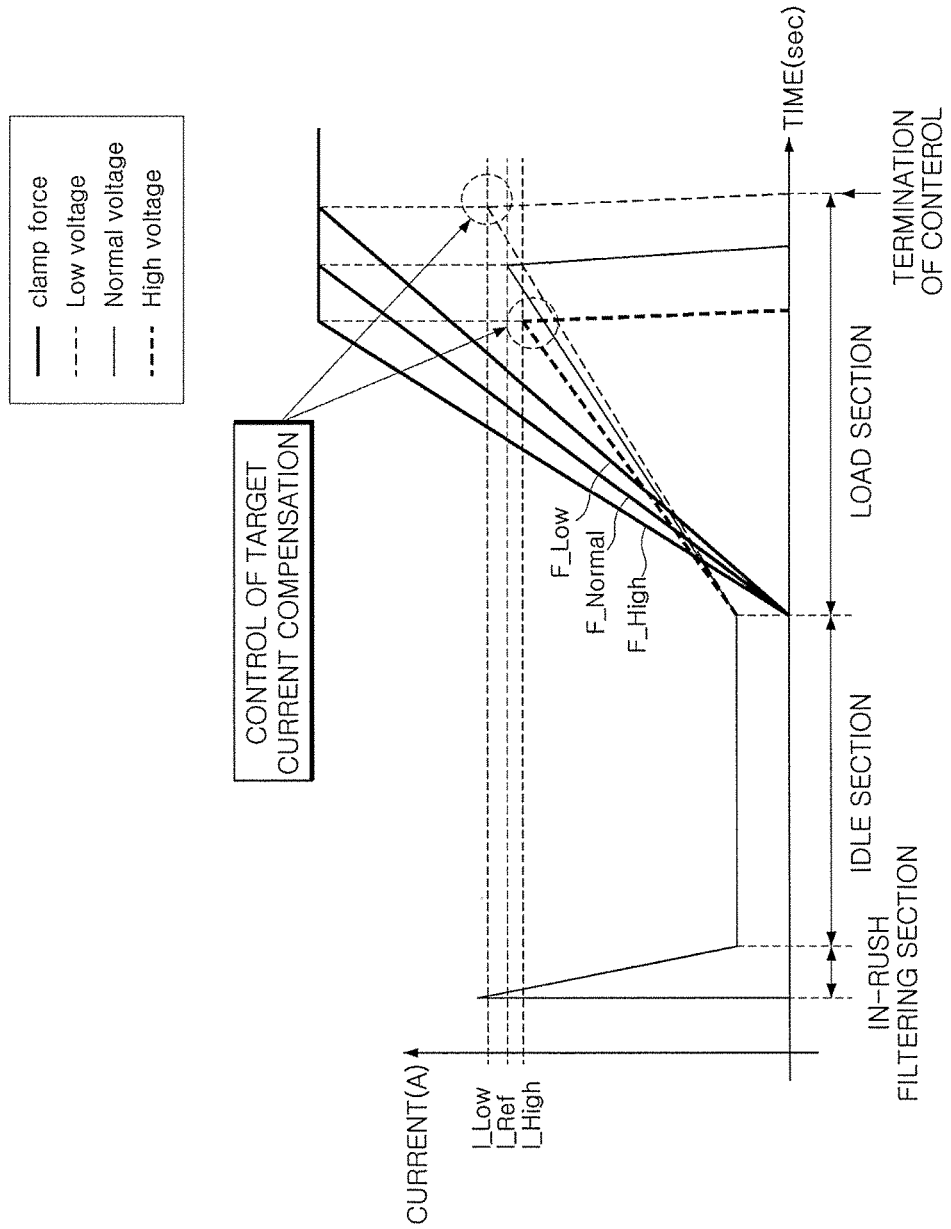
FIGS. 4 to 7 are diagrams for describing compensation of a target current according to a motor voltage in the parking apply mode in the EPB system according to one embodiment of the present disclosure.
Figure 5:
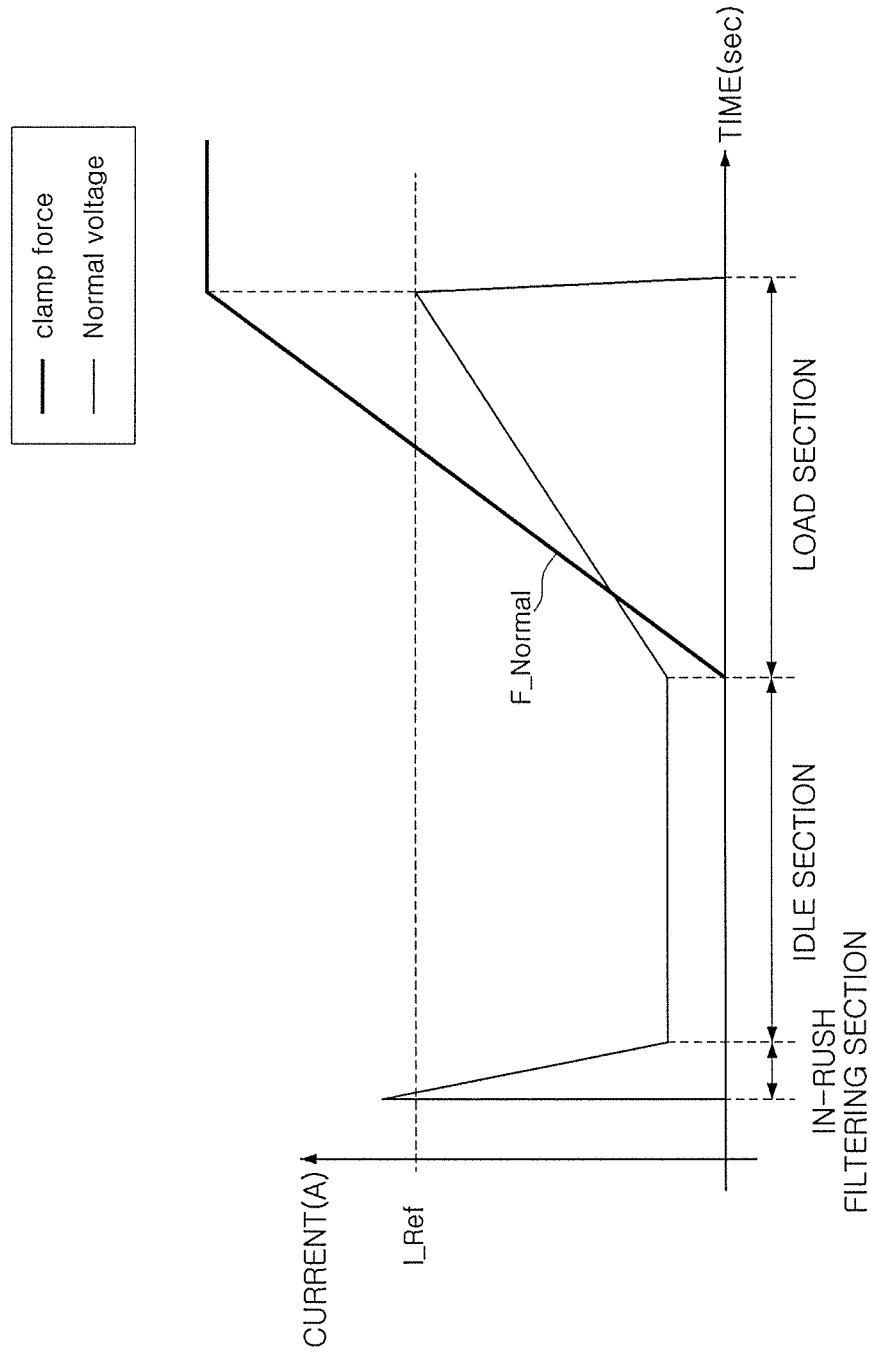
Figure 6:
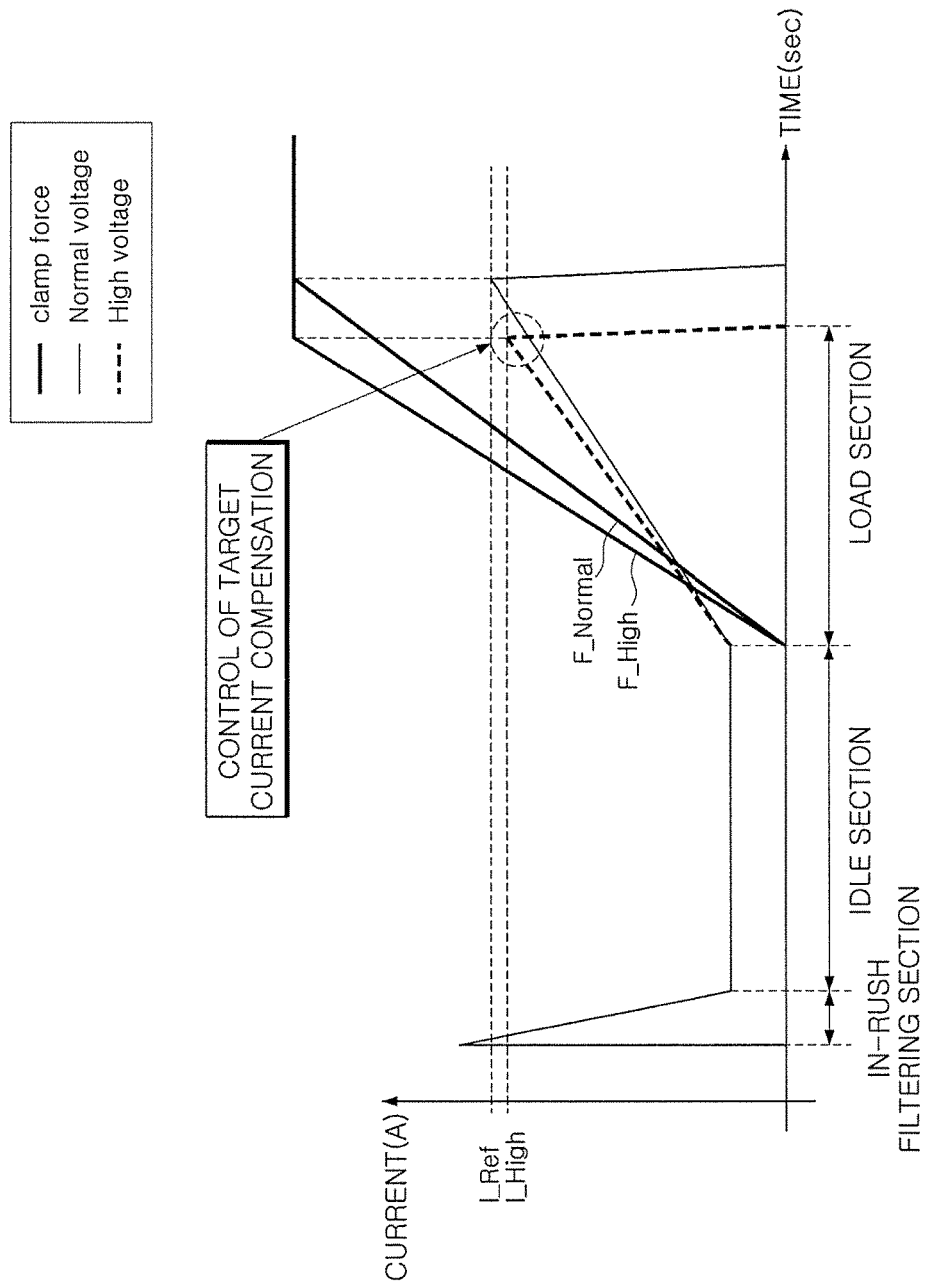
Figure 7:
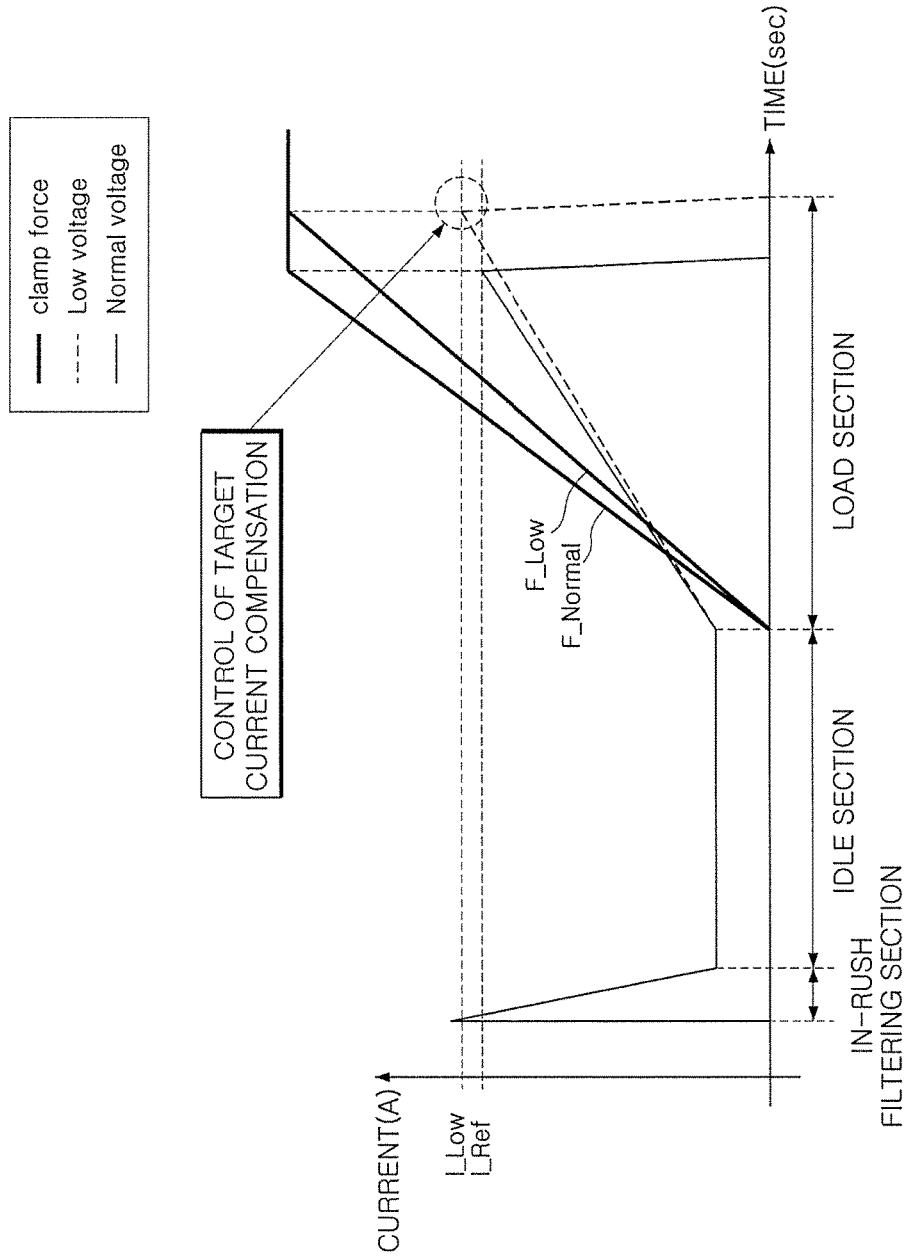

FIG. 3 is a diagram for describing an operation of the electric motor in a parking apply mode and a parking release mode in the EPB system according to one embodiment of the present disclosure.

Referring to FIG. 3, the motor driver 240 may simultaneously turn on a first relay Relay 1 and turn off a second relay Relay 2 to rotate the electric motor 141 in one direction. Conversely, the motor driver 240 may simultaneously turn off the first relay Relay 1 and turn on the second relay Relay 2 to rotate the electric motor 141 in a reverse direction. When the electric motor 141 is unidirectionally rotated by the motor driver 240 to execute the parking apply mode, the unidirectional rotation of the electric motor 141 rotates the spindle member 135 via the decelerator 142 and the nut member 131 pressurizes the piston 121 as the spindle member 135 is rotated. Accordingly, the piston 121 pressurizes the inner pad plate 111, and thus the inner pad plate 111 comes into close contact with the disc D such that the parking brake force is generated. When the parking release mode is executed, the parking release mode is executed in a way opposite to that when the parking apply mode is executed.

Referring back to FIG. 2, the counter 250 counts an operation time of the electric motor 141 according to operation modes (that is, a parking apply operation mode and a parking release mode).

The storage 260 stores preset values corresponding to the operation modes (that is, a parking application and a parking release). The preset values are set differently for the operation modes.

In the parking apply mode, the ECU 200 rotates the electric motor 141 of the EPB actuator 140 in one direction through the motor driver 240, and thus the inner pad plate 111 pressurized by the piston 121 is moved and the friction pad 113 comes into close contact with the disc D such that the parking application that provides the parking braking force is performed.

In the parking release mode, the ECU 200 rotates the electric motor 141 of the EPB actuator 140 in the reverse direction through the motor driver 240, and thus the friction pad 113 in close contact with the disc D is disengaged such that the parking release that releases the parking brake force is performed.

When a parking apply signal is input through the parking switch 210, the ECU 200 executes the parking apply mode, calculates a parking braking force which will be generated according to a condition of a vehicle condition, and applies driving power to the electric motor 141 of the EPB actuator 140 through the motor driver 240 such that a current flows to electric motor 141, thereby driving the electric motor 141 to generate the calculated parking braking force.

Generally, when the electric current flowing in the electric motor 141 reaches a target current after supplying a target voltage corresponding to the parking braking force which will be generated in the parking apply mode, the control of the parking apply is terminated. This refers to the control of the parking apply being terminated when the electric current flowing in the electric motor 141 reaches the target current under the assumption that the target voltage is supplied to the electric motor 141.

However, when a voltage that is higher or lower than the target voltage is supplied to the electric motor 141, the parking braking force is excessive or insufficient and a sufficient parking braking force may not be generated or an unnecessarily excessive parking braking force may be generated.

Accordingly, in the parking apply mode, the ECU 200 appropriately changes the target current using a voltage applied to the electric motor 141 to compensate for the parking braking force according to a situation. That is, when the parking apply mode is executed, the ECU 200 drives the electric motor 141 through the motor driver 240 and detects the voltage supplied to the electric motor 141 through the voltage sensor 230 while the electric motor 141 is driven. The ECU 200 changes the target current to correspond to the parking apply mode that is executed on the basis of the sensed voltage to compensate for the parking braking force using the voltage supplied to the electric motor 141. The ECU 200 senses the current flowing in the electric motor 141 through the current sensor 220 and controls an operation of the electric motor 141 until the sensed current reaches the changed target current.

At this point, when the sensed voltage is the target voltage, the ECU 200 maintains the target current having a preset reference current value. Also, when the sensed voltage is higher than the target voltage, the ECU 200 changes the target current to a current value that is smaller than the reference current value. On the other hand, when the sensed voltage is lower than the target voltage, the ECU 200 changes the target current to a current value that is greater than the reference current value.

As described above, in the embodiment of the present disclosure, the target braking force is constantly maintained by compensating for the target current using the voltage applied to the electric motor, which is the most prominent factor that affects the parking braking force, so that a sufficient parking braking force can be obtained without setting a large margin for the parking braking force such that a price and weight of a product can be reduced to enhance competitiveness of the product.

FIGS. 4 to 7 are diagrams for describing compensation of a target current according to a motor voltage in the parking apply mode in the EPB system according to one embodiment of the present disclosure.

Referring to FIGS. 4 to 7, when a parking apply signal is input through the parking switch 210, the ECU 200 applies power to the electric motor 141.

When the electric motor 141 starts to be rotated as the power is applied to the electric motor 141, an inrushing current flows in the electric motor 141 as shown in an in-rush filtering section.

Until the friction pad 113 comes into contact with the disc D by rotation of the electric motor 141 after the inrushing current flows, an idle state in which no load acts on the electric motor 141 is formed as shown in an idle section. At this point, a current having a constant current value of 0 or more flows in the electric motor 141 for a predetermined time.

When the friction pad 113 comes into initial contact with the disc D, since a load acting on the electric motor 141 is gradually increased as shown in a load section, the current flowing in the electric motor 141 is also increased in proportion to a magnitude of the load.

The ECU 200 senses a motor voltage applied to the electric motor 141 in the idle section through the voltage sensor 230.

When the sensed motor voltage is the target voltage, the ECU 200 maintains a first target current I_Ref having the preset reference current value as a target current. The ECU 200 senses a current flowing in the electric motor 141 through the current sensor 220, drives the electric motor 141 until the sensed current reaches the first target current I_Ref, and terminates parking application control when the current flowing in the electric motor 141 reaches the first target current I_Ref. Accordingly, the motor voltage generates a first parking braking force F_Normal corresponding to a normal voltage.

Also, when the sensed voltage is higher than the target voltage, the ECU 200 changes the target current to a second target current I_High having a current value that is smaller than the preset reference current value. At this point, the current value of the second target current I_High is limited within the preset reference current value to prevent an excessive decrease of the parking braking force due to an excessive adjustment of the target current. That is, a maximum control tolerance value of a changeable target current value is set to prevent an excessive reduction of the parking braking force.

The ECU 200 senses the current flowing in the electric motor 141 through the current sensor 220, drives the electric motor 141 until the sensed current reaches the second target current I_High, and terminates the parking application control when the current flowing in the electric motor 141 reaches the second target current I_High. Accordingly, the motor voltage generates a second parking braking force F_High corresponding to a high voltage that is higher than the normal voltage. That is, when the motor voltage is higher than the target voltage, the target current is decreased to the second target current I_High such that the parking braking force is decreased from the first parking braking force F_Normal to the second parking braking force F_High. Consequently, the parking braking force may be constantly maintained even when the motor voltage is increased.

Meanwhile, when the sensed voltage is higher than the target voltage, the ECU 200 changes the target current to a third target current I_Low having a current value that is higher than the reference current value. At this point, when the target current is adjusted in a state in which the sensed voltage is lower than the target voltage above a preset voltage, an unstable factor for safety may be caused so that the target current may be controlled to be changed within a range in which the sensed voltage is not lower than the target voltage above the preset voltage. That is, a minimum control tolerance voltage range is set and applied to remove the unstable factor due to the adjustment of the target voltage around a low voltage so that a predetermined amount of safety margin is secured at the low voltage.

The ECU 200 senses the current flowing in the electric motor 141 through the current sensor 220, drives the electric motor 141 until the sensed current reaches the third target current I_Low, and terminates the parking application control when the current flowing in the electric motor 141 reaches the third target current I_Low. Accordingly, a third parking braking force F_Low corresponding to the low voltage in which the motor voltage is lower than the normal voltage is generated. That is, when the motor voltage is lower than the target voltage, the target current is increases to the third target current I_Low such that the parking braking force is increased from the first parking braking force F_Normal to the third parking braking force F_Low. Consequently, the parking braking force may be constantly maintained even when the motor voltage is decreased.

Meanwhile, although the above-described embodiment has been described as changing, when the parking apply mode is executed, the target current to correspond to the parking operation mode that is executed on the basis of the motor voltage supplied to the electric motor 141, which is sensed through the voltage sensor 230, and controlling the operation of the electric motor 141 according to the changed target current, the present disclosure is not limited thereto.

The voltage sensor 230 may include a voltage sensor configured to sense a voltage of a vehicle battery providing power to the electric motor 141.

In this case, a voltage of the vehicle battery is monitored through the voltage sensor 230 before the parking apply mode is executed. Further, the target current corresponding to the parking apply mode that is executed on the basis of the voltage of the vehicle battery sensed when the parking apply mode is executed at a time before the parking apply mode is executed or at an execution time of the parking apply mode may be changed and the operation of the electric motor 141 may be controlled according to the changed target current.

At this point, when the sensed voltage of the vehicle battery is higher than the target voltage, the target current may be changed to a first target current having a current value that is lower than the reference current value, and, when the sensed voltage of the vehicle battery is lower than the target voltage, the target current may be changed to a second target current having a current value that is higher than the reference current value.

Also, the voltage sensor 230 may include both a voltage sensor configured to sense the voltage of the vehicle battery providing power to the electric motor 141 and a voltage sensor configured to sense the motor voltage of the electric motor 141.

In this case, the target current may be changed on the basis of the motor voltage in the idle section, and a current change width may be increased or decreased using the voltage of the vehicle battery. Conversely, the target current may be changed on the basis of the voltage of the vehicle battery, and the current change width may be increased or decreased using the motor voltage in the idle section.

As should be apparent from the above description, the EPB system according to the embodiments of the present disclosure is capable of reducing a price and weight of a product and enhancing competitiveness of the product by compensating for a target current using a voltage applied to an electric motor, which is the most prominent factor that affects a parking braking force, to constantly maintain a target braking force, thereby obtaining a sufficient parking braking force without setting a large margin for the parking braking force.

What is claimed is:

1. An electronic parking brake (EPB) system including an EPB actuator operated by an electric motor, the EPB system comprising:
   a motor driver configured to drive the electric motor of the EPB actuator;
   a current sensor configured to sense a current flowing in the electric motor;
   a voltage sensor configured to sense a voltage supplied to the electric motor; and an electronic control unit (ECU) configured to change a target current to correspond to a parking apply mode that is executed on the basis of a voltage supplied to the electric motor, which is sensed through the voltage sensor when the parking apply mode is executed, and control an operation of the electric motor according to the changed target current.

2. The EPB system of claim 1, wherein, when the sensed voltage is higher than a target voltage, the ECU changes the target current to a first target current having a current value that is lower than a reference current value.

3. The EPB system of claim 1, wherein, when the sensed voltage is lower than a target voltage, the ECU changes the target current to a second target current having a current value that is higher than a reference current value.

4. The EPB system of claim 1, wherein the ECU changes the target current to correspond to the parking apply mode that is executed on the basis of a voltage supplied to the electric motor, which is sensed through the voltage sensor in an idle section in which no load acts on the electric motor to form an idle state.

5. An electronic parking brake (EPB) system including an EPB actuator operated by an electric motor, the EPB system comprising:
   a motor driver configured to drive the electric motor of the EPB actuator;
   a current sensor configured to sense a current flowing in the electric motor;
   a voltage sensor configured to sense a voltage supplied to the electric motor; and
   an electronic control unit (ECU) configured to drive the electric motor by supplying power to the electric motor through the motor driver when a parking apply mode is executed, sense a voltage supplied to the electric motor through the voltage sensor in an idle section in which no load acts on the electric motor to form an idle state while the electric motor is driven, change a target current to correspond to the parking apply mode that is executed on the basis of the sensed voltage, sense the current flowing in the electric motor through the current sensor, and drive the electric motor until the sensed current reaches the changed target current.

6. An electronic parking brake (EPB) system including an EPB actuator operated by an electric motor, the EPB system comprising:
   a motor driver configured to drive the electric motor of the EPB actuator;
   a current sensor configured to sense a current flowing in the electric motor;
   a voltage sensor configured to sense a voltage of a vehicle battery supplying power to the electric motor; and
   an electronic control unit (ECU) configured to sense the voltage of the vehicle battery through the voltage sensor, change a target current to correspond to a parking apply mode that is executed on the basis of the sensed voltage of the vehicle battery when the parking apply mode is executed, and control an operation of the electric motor according to the changed target current.

7. The EPB system of claim 6, wherein, when the sensed voltage of the vehicle battery is higher than the target voltage, the ECU changes the target current to a first target current having a current value that is lower than a reference current value, and, when the sensed voltage of the vehicle battery is lower than the target voltage, the ECU changes the target current to a second target current having a current value that is higher than the reference current value.

* * * * *